May 28, 1957     A. MARTIN     2,794,109
APPARATUS FOR METALWORKING BY ELECTRICAL DISCHARGE
Filed Oct. 27, 1954     4 Sheets-Sheet 2

INVENTOR
ALBERT MARTIN
By Frederick E. Hane
ATTORNEY

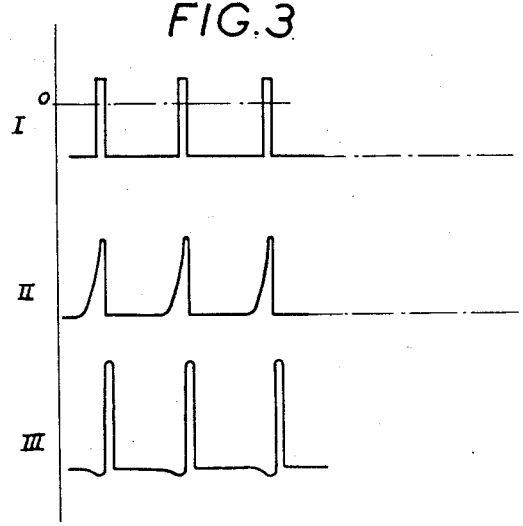
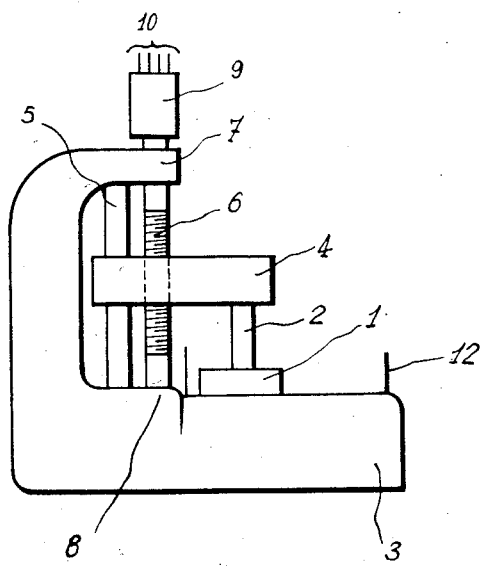

United States Patent Office 2,794,109
Patented May 28, 1957

2,794,109

APPARATUS FOR METALWORKING BY ELECTRICAL DISCHARGE

Albert Martin, Pierrefitte-sur-Seine, France, assignor to Societe a Responsabilite Limitee dite: Qualitex, Dunod & Cie, Paris, France Application October 27, 1954, Serial No. 465,049

Claims priority, application France June 5, 1954

11 Claims. (Cl. 219—69)

This invention relates to improved apparatus for performing metalworking operations by electrical discharge.

A general object of the invention is to improve the degree of accuracy and surface finish attainable in metalworking operations utilizing the electrical discharge principle.

Another object is to provide means for creating electrical discharges having a higher energy content and a higher repetition rate than was hitherto considered practicable in connection with metalworking operations, whereby such operations may be completed in a single pass where more passes than one were necessary heretofore.

A further object is to provide means for maintaining the discharge energy substantially constant in an operation of the specified kind.

A further object is to provide improved electronic apparatus for controlling the spacing between the work and the discharge electrode throughout a metalworking process of the kind specified.

A further object is to provide improved control apparatus for performing metalworking operations by electrical discharge, which will be comparatively simple and economical to construct, efficient and reliable in operation, and which will be readily adaptable in connection with a wide diversity of metalworking or machining operations.

Further objects will appear as the disclosure proceeds.

Briefly, in a main aspect thereof, the invention may comprise a reversible motor selectively energizable in opposite directions for moving the work and electrode towards and away from each other, a pulse generator, including means for controlling the width of the generated pulses, means operated by said pulses for creating a discharge between the work and electrode, means responsive to the energy content of the discharge and controlling said pulse generator for varying the width of the generated pulses with respect to a predetermined reference value, so as to decrease pulse width as said energy increases and vice versa, and means responsive to the width of the pulses and operative to energize the motor in a direction to move the work and electrode towards each other when the pulse width is more than said reference value and away from each other when pulse width is less than the reference value, whereby the energy content of the discharge will be held substantially to a constant value.

The invention also contemplates in another aspect thereof the storage of electrical pulse energy in the form of magnetic energy in a transformer having a high stepdown ratio, the primary of the transformer being connected to the output of the pulse generating system and its secondary being connected across the work and the electrode, whereby improved short-duration high-intensity discharges may be achieved having a high repetition rate.

One embodiment of the invention will now be described for purposes of illustration but not of limitation, with reference to the accompanying drawings, wherein:

Figures 1 and 2, when put together with the right-hand end conductors of Figure 1 connected with the left-hand end conductors of Figure 2, illustrate the general wiring diagram of one embodiment of the improved system;

Figure 3 are graphs illustrating pulse forms in various parts of the system;

Figure 4 is a diagrammatic view, in side elevation, of a machine-tool construction in connection with which the novel control system may be used;

Figure 1:
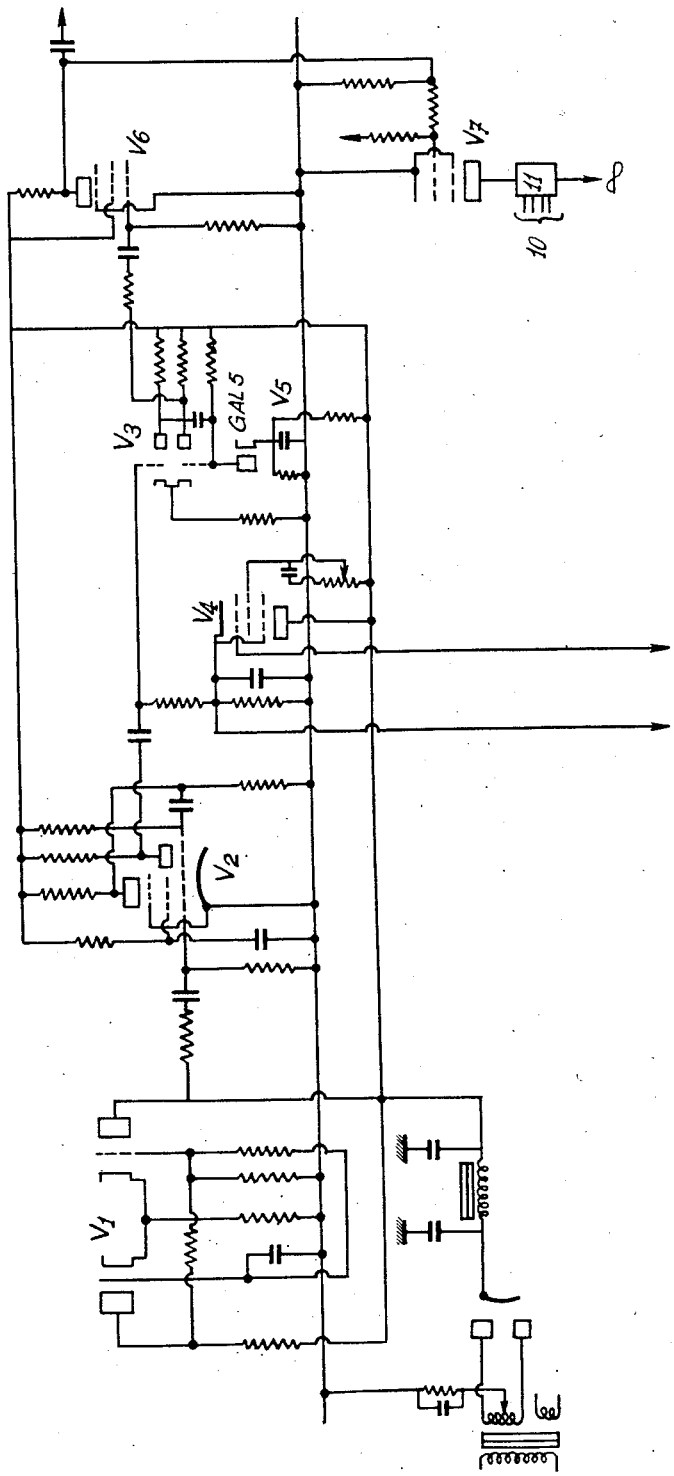

As shown, an input stage comprises a double-triode input tube $V_1$ connected as a Charbonnier type generator or oscillator adapted to produce square output pulses. These pulses from the output of the right anode of $V_1$ are passed through a limiter circuit comprising a pentode $V_2$ and the output pulses are differentiated in a conventional differentiating R–C network. The differentiated pulses are applied to the input grid of a one-shot multivibrator comprising a double triode tube $V_3$. The tube $V_3$ has another grid (the lower one as shown) held at a fixed potential by means of a diode $V_5$ while the input (upper) grid of $V_3$ is variably biased by means to be described for controlling the width or duration of the output pulses from the multivibrator.

This variable grid bias is derived across the cathode load resistance of a cathode-follower pentode $V_4$. The output current of tube $V_4$ is controlled in response to a variable voltage applied to the control grid thereof. As will later appear, this latter voltage in turn is a function of the output current from the system. In this way, the average output from the system is maintained substantially constant; thus, should the instantaneous current output increase, the time duration of the current flow will decrease in proportion.

The above arrangement provides a simple and efficient means of controlling the position of the electrode with respect to the work.

As the distance from the electrode to the workpiece decreases the load consumed by the output stage tends to increase. This results in a decrease of the width of the square pulse generated by the one-shot multivibrator. This square pulse is differentiated in a network having a suitably predetermined time constant and the positive ones of the differentiation pulses thus derived are arranged to fire a gas discharge tube such as a thyratron $V_7$ connected in parallel with the output of amplifier $V_6$.

Gas tube $V_7$ when fired sets a reverser switch 11 to one of its two conditions while in the absence of a discharge from tube $V_7$ the switch returns to its other condition.

Switch 11 controls the field connections 10 of a reversible electric motor 9 (Fig. 4) serving to reciprocate the electrode 2 towards and away from the workpiece 1, the arrangement being such that when the switch is in its one above mentioned condition the motor is rotated to actuate the electrode towards the workpiece (e. g. downwardly) while in its other position the switch 11 reverses the motor supply connections so that the motor is rotated to move the electrode away from the work (e. g. upwards).

Figure 5:
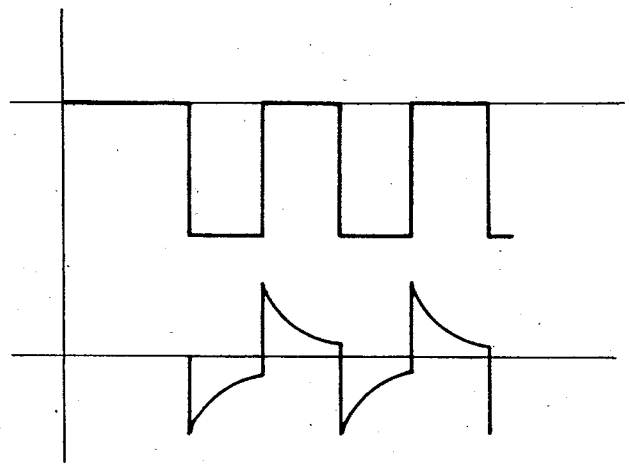
Figure 5 is a graph illustrating the pulses before and after differentiation in case the pulse width exceeds the reference value.
Figure 6:
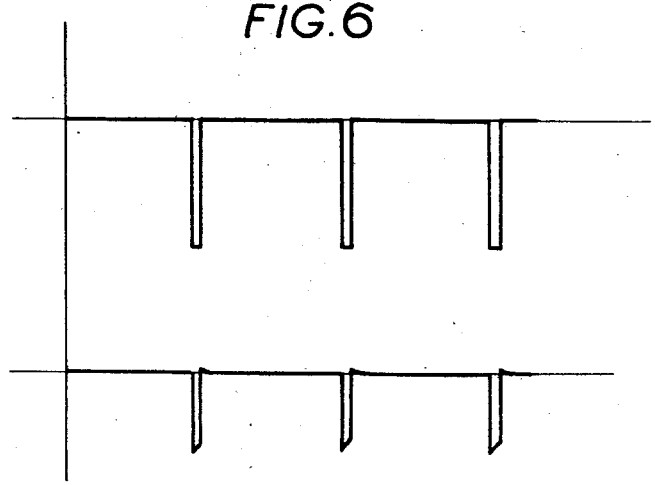
Figure 6 is a similar graph where the pulse width is less than the reference value.

The above mentioned network time constant is so predetermined that when the pulses generated by one-shot multivibrator $V_3$ exceed in width a predetermined duration (as shown in Fig. 5, upper line), both the falling and the rising edges of the negative pulse are differentiated to produce a differentiated pulse train of the double sawtooth pattern schematically illustrated on the lower line of Fig. 5, having positive peaks of substantial amplitude sufficient to fire the gas discharge tube $V_6$. When however the width of said pulses drops below a predetermined small limiting value (see Fig. 6, upper line), the time constant of the differentiating network does not allow differentiation of the rising edge of each pulse, and the resulting differentiated pattern, as indicated on the bottom line of Fig. 6, substantially does not present any positive peaks capable of firing the gas tube. Thus it will be understood that for pulse widths above said limit the electrode motor will be energized in a direction to move the electrode towards the work, while for pulse widths below said limiting value the motor will be energized in the opposite direction to move the electrode away from the work.

Figure 2:
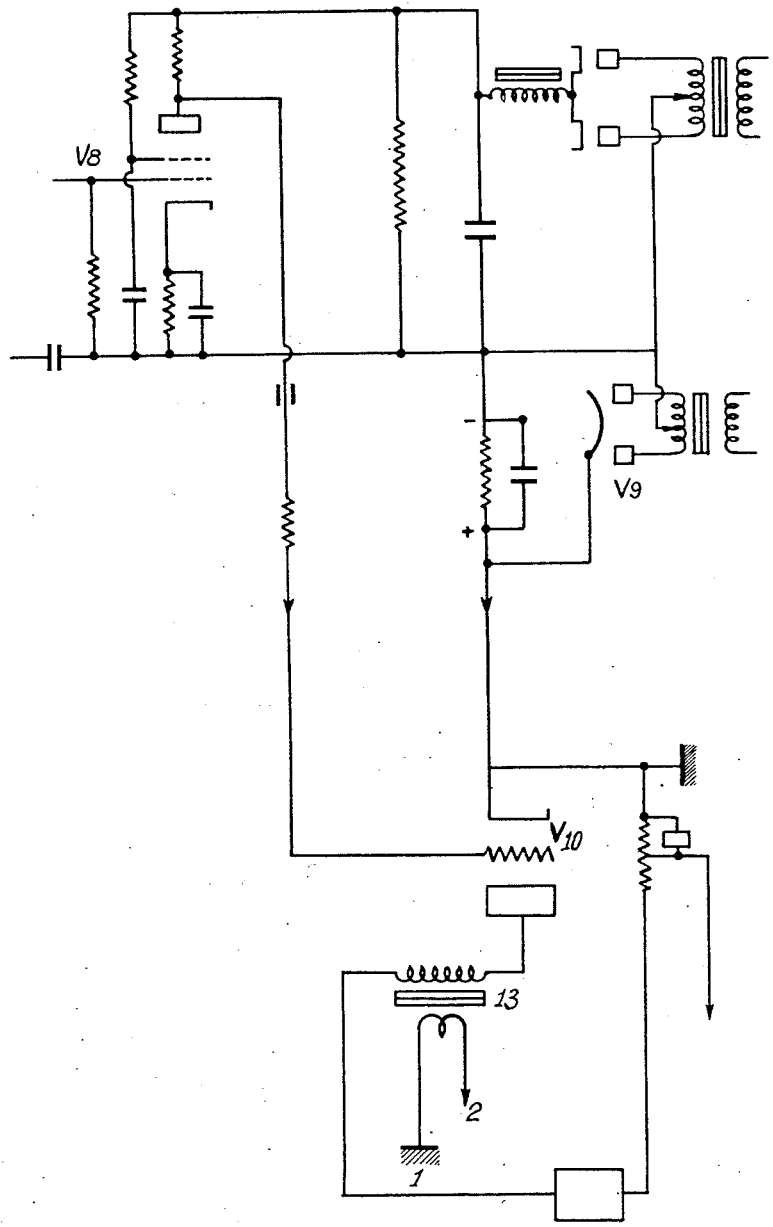

An amplifier stage (Fig. 2) comprises a tetrode $V_8$ directly coupled with the output tube $V_6$ mentioned above. The bias voltage for tube $V_8$ is provided from the source through a rectifier network $V_9$.

An output stage comprises a power amplifier tube $V_{10}$ having its grid supplied from the anode of tube $V_8$ and adapted to operate as a class C amplifier. The anode output of tube $V_{10}$ is supplied to the primary of an output transformer 13 serving both as an impedance matching means between tube $V_{10}$ and the load circuit comprising the workpiece 1 and electrode 2, and as a means of energy storage.

In operation, tube $V_{10}$ operating as a class C amplifier is normally biased beyond cutoff so that no output signal is normally present in the anode circuit of this tube. When however an amplified pulse is applied to the grid of tube $V_{10}$ the grid goes sufficiently positive for the duration of the pulse (see Figure 3–I) to cause the tube to conduct. Current flows through the primary of output transformer 13 in a wave pattern substantially as indicated in Fig. 3–II.

The leading wave of the signal rises somewhat gradually as shown, while the lagging edge is vertical, so that the grid bias of tube $V_{10}$ is returned sharply to cutoff. This produces a very sharp variation in the magnetic flux through the transformer core. The secondary of the transformer consists of a few turns of large diameter conductor. The sharp flux variation just mentioned induces in the secondary a large instantaneous current which flows from the electrode to the workpiece, provided the spacing therebetween has the correct value (see Fig. 3–III). In this way the usual spark-machining operation can be effected in a particular efficient manner owing to the short, high-intensity instantaneous action which is repeated at shortly spaced intervals, such that the duration of current flow will nevertheless remain small as compared to the repetition rate.

It is found that the surface condition of the resulting work shows remarkably improved smoothness and accuracy to the extent that successive passes are found to be unnecessary.

The transformer core may desirably be made from a low-hysteresis magnetic material such as the material known as "Ferrowcube" or equivalent materials.

Figure 4 illustrates one example of a drilling jig in connection with which the invention may be embodied.

A supporting frame 3 has bearings 7 and 8 formed in vertical alignment thereon. A lead screw 6 is mounted for rotation in said bearings while being prevented from axial displacement. The lead screw 6 is driven by the reversible electric motor 9.

An electrode support or head 4 is formed with a screw-threaded bore to engage the threads of lead screw 6. Moreover the head 4 is prevented from rotation by means of guide posts such as 5 secured to the frame. Projecting downwards from the head 4 is an electrode 2. The workpiece to be drilled is illustrated at 1 as being mounted on the flat base of the frame. The reference 12 indicates the walls of a tank or container adapted to contain a body of dielectric fluid surrounding the work, as in conventional spark-machining processes. In operation, the motor 9 is rotated in one or the other direction on energization of suitable ones of the conductors 10 from the output of the control circuit previously described. Rotation of the motor produces corresponding up or down displacement of the electrode head 4 and of the electrode 2 relatively to the work 1.

It will be understood that, while a single embodiment of an improved control circuit according to the invention has been illustrated and described, modifications may be made therein and the circuit may be applied to a wide variety of spark-machining operations other than the drilling process specifically mentioned, without exceeding the limits of the ensuing claims.

I claim:

1. An apparatus for machining a workpiece by spark erosion, comprising a movable electrode, reversible motor means coacting with said electrode to decrease in one rotational direction the distance between the workpiece and the electrode and in the opposite direction to increase said distance, electronic means for generating a train of electrical pulses of controllable duration, means connected with said generating means and responsive to each pulse to cause an arc discharge between the electrode and the workpiece, means responsive to the discharge current for controlling the generating means to decrease said pulse duration as the discharge current increases and to increase said pulse duration as the discharge current decreases and means operated by said pulses and responsive to the duration thereof connected to said motor means for energizing the motor means in one or the other direction according as said pulse duration is more or less than a predetermined value.

2. An apparatus for machining a workpiece by spark erosion, comprising a movable electrode, reversible motor means energizable in opposite directions coacting with the electrode for moving the electrode towards and away from the workpiece, electronic means for generating electric pulses of controllable width, means operated by said pulses for causing an arc discharge between the workpiece and the electrode, means responsive to the discharge and controlling the generating means for varying the width of said pulses in accordance with the discharge current and means operated by said pulses responsive to the width thereof and connected to said motor means for energizing said motor means in one or the other direction to vary the position of the electrode so that the said discharge current remains substantially constant.

3. An apparatus for machining a workpiece by spark erosion, comprising a movable electrode, motor means energizable in opposite directions and coacting with the electrode for moving the same towards and away from the workpiece, electronic means for generating signals having a characteristic controllable with respect to a reference value, means operated by said signals for causing an arc discharge between the workpiece and the electrode, means responsive to the discharge and controlling said gnerating means for varying said characteristic in accordance with the intensity of said discharge, and means responsive to the value of said characteristic with respect to said reference value and connected to said motor means for energizing said motor means in one or the other direction so as to maintain the intensity of said discharge substantially constant.

4. An apparatus for machining a workpiece, by spark erosion, comprising a movable electrode, motor means energizable in opposite directions and coacting with the electrode for moving the electrode toward and away from the workpiece, electronic means for generating a train of electrical pulses, means for varying the width of said pulses, a high step-down ratio transformer having a primary supplied with said pulses and a secondary connected across said workpiece and said electrode for creating a high-intensity arc discharge therebetween on occurrence of a pulse, means connected with said transformer and responsive to the intensity of said discharge, and means operated by said intensity-responsive means and controlling said pulse-width varying means for reducing pulse width as said intensity increases and vice versa, and means responsive to the width of said pulses relative to a reference value and operative to energize said motor means for moving the electrode away from the workpiece when said width is less, and for moving the electrode towards the workpiece when said width is more than said reference value, whereby the intensity of said discharge is maintained substantially constant.

5. An apparatus for machining a workpiece by spark erosion, comprising a movable electrode, electronic means for generating a train of electrical pulses, means for varying the width of said pulses, a high step-down ratio transformer having a primary supplied with said pulses and a secondary connected across said workpiece and said electrode for creating a high-intensity arc discharge therebetween on occurrence of a pulse, means connected with said transformer and responsive to the current generated by said discharge, and means operated by the last-mentioned means and controlling said pulse-width varying means for reducing the pulse width as said current increases and vice versa.

6. An apparatus for machining a workpiece by spark erosion, comprising an electrode, electronic means for generating a train of electrical pulses, means for varying the width of said pulses, means having an input supplied with said pulses and an output connected with said electrode and said workpiece for causing an arc discharge therebetween on occurrence of a pulse, means connected with said discharge means and responsive to the energy of said discharge, and means operated by said energy-responsive means and controlling said pulse width varying means for maintaining said energy substantially constant.

7. An apparatus for machining a workpiece by spark erosion, comprising an electrode, reversible motor means operative to vary the distance between the workpiece and the electrode, reversing switch means movable to one position for energizing said motor in a direction to reduce, and to another position for energizing the motor in a direction to increase the distance between the workpiece and the electrode, electronic means for generating a train of electrical pulses, means for varying the width of said pulses, means connected with said generating means and operative at each pulse to create an arc discharge between the workpiece and electrode, means responsive to the discharge current and controlling said pulse width varying means for decreasing the pulse width as the discharge current increases and increasing the pulse width as said current increases, a network having a predetermined time constant with an input connected with said generating means and an output adapted to produce a signal of one form when said pulse width is more, and of another form when said pulse width is less, than a reference value as determined by said time constant, and means connected with said network output and with said reversing switch for moving the switch to its said one position when said network output signal is of said one form, and to its said other position when said signal is of said other form.

8. The combination claimed in claim 7, wherein said network comprises a differentiating network.

9. The combination claimed in claim 7, wherein said last-mentioned means comprises a gas discharge tube.

10. The combination claimed in claim 7, wherein said network comprises a differentiating network predetermined to provide at its said output differentiated signal peaks of positive and negative polarity, when said pulse width is more, and signal peaks of only one of said polarities when said pulse width is less, than said reference value, and wherein said last-mentioned means comprises a gas discharge tube responsive to signals of only the other one of said polarities.

11. The combination claimed in claim 7, wherein said discharge creating means comprises a high stepdown ratio transformer having its primary connected with said generating means and its secondary connected across said work and electrode.

References Cited in the file of this patent

UNITED STATES PATENTS

| 2,173,446 | Heindlhofer | Sept. 19, 1939 |
| 2,175,017 | Cockrell | Oct. 3, 1939 |
| 2,391,085 | Crandell | Dec. 18, 1945 |
| 2,501,954 | McKechnie et al. | Mar. 28, 1950 |
| 2,539,439 | Kumler | Jan. 30, 1951 |

FOREIGN PATENTS

| 637,793 | Great Britain | May 24, 1950 |
| 1,062,480 | France | Dec. 9, 1953 |
| 1,065,986 | France | Jan. 13, 1954 |